US012571673B2

(12) United States Patent
Cai et al.

(10) Patent No.: US 12,571,673 B2
(45) Date of Patent: Mar. 10, 2026

(54) MULTI-SPAN OPTICAL FIBER DAS SYSTEM WITH AMPLIFIED-FILTERED LOOPBACK (AFLB)

(71) Applicant: SUBCOM, LLC, Eatontown, NJ (US)

(72) Inventors: Jin-Xing Cai, Morganville, NJ (US);
Carl R. Davidson, Warren, NJ (US);
William W. Patterson, Freehold, NJ (US); Alexei N. Pilipetskii, Colts Neck, NJ (US)

(73) Assignee: SubCom, LLC, Eatontown, NJ (US)

( * ) Notice: Subject to any disclaimer, the term of this patent is extended or adjusted under 35 U.S.C. 154(b) by 305 days.

(21) Appl. No.: 18/224,441

(22) Filed: Jul. 20, 2023

(65) Prior Publication Data

US 2024/0027259 A1      Jan. 25, 2024

Related U.S. Application Data

(60) Provisional application No. 63/391,038, filed on Jul. 21, 2022.

(51) Int. Cl.
*G01H 9/00*          (2006.01)
(52) U.S. Cl.
CPC .................................... *G01H 9/004* (2013.01)
(58) Field of Classification Search
None
See application file for complete search history.

(56) References Cited

U.S. PATENT DOCUMENTS

2016/0169768 A1* 6/2016 Handerek ............. G01L 11/025
                                                    356/477
2019/0229803 A1* 7/2019 Xu ......................... H04B 10/07
(Continued)

FOREIGN PATENT DOCUMENTS

EP          4020847 A1      6/2022
EP          4106227 A1      12/2022
EP          4160941 A1      4/2023

OTHER PUBLICATIONS

Bian et al., "Vibration measurement technique for repeated fiber-optic hydrophone transmission cable system," In Proceedings of Society of Photo-Optical Instrumentation Engineers (SPIE), vol. 11554, Advanced Sensor Systems and Applications X, 115541C (Oct. 10, 2020)—Abstract.
(Continued)

*Primary Examiner* — Eric S. McCall
*Assistant Examiner* — Nigel H Plumb
(74) *Attorney, Agent, or Firm* — KDW Firm PLLC

(57) ABSTRACT
A sensing system may include a distributed acoustic sensing (DAS) station to launch a DAS signal as an outbound DAS signal, as well as a plurality of DAS loopback assemblies, arranged along a plurality of spans. The plurality of DAS loopback assemblies may be arranged to separately process the outbound DAS signal, and return to the DAS station, the outbound DAS signal, as a return DAS signal that comprises a backscattered Rayleigh signal. As such, a given DAS loopback assembly of the plurality of DAS loopback assemblies may include an Erbium-Doped Fiber Amplifier (EDFA) that is arranged to compensate the loss from Rayleigh scattering of the DAS signal, and a filter device having an optical filtering function that is arranged to selectively send back just a sensing wavelength of the DAS signal.

21 Claims, 6 Drawing Sheets

West

East

*100*

(56) References Cited

U.S. PATENT DOCUMENTS

| | | | |
|---|---|---|---|
| 2022/0205866 A1* | 6/2022 | Mohs ..................... | G01V 1/226 |
| 2022/0397448 A1* | 12/2022 | Pilipetskii ............ | H04B 10/071 |
| 2023/0095884 A1* | 3/2023 | Ellmauthaler .......... | E21B 47/06 |
| | | | 367/35 |

OTHER PUBLICATIONS

European Search Report for EP Application No. 23186359.8, dated Nov. 27, 2023, 9 pages.

European Search Report for EP Application No. 24209130.4, dated Mar. 27, 2025, 9 pages.

M. E. Fermann et al., "Nonlinear amplifying loop mirror," Opt. Lett. 15, 752-754 (1990).

Document No. SEAFOM—Measuring Sensor Performance Document—02 (SEAFORM MSP-02) DAS Parameter Definitions and Tests Issue Date: Aug. 2018, https://seafom.com/published-documents/.

Muhammad I. M. Abdul Khudus et al., "Phase matched parametric amplification via four-wave mixing in optical microfibers," Opt. Lett. 41, 761-764 (2016).

* cited by examiner

*400*

400

MULTI-SPAN OPTICAL FIBER DAS SYSTEM WITH AMPLIFIED-FILTERED LOOPBACK (AFLB)

RELATED APPLICATIONS

This application claims priority to U.S. provisional patent application Ser. No. 63/391,038, entitled MULTISPAN OPTICAL FIBER SYSTEM FOR IMPROVED DISTRIBUTED ACOUSTIC SENSING, filed Jul. 21, 2022, and incorporated by reference herein in its entirety.

BACKGROUND

Field

Embodiments of the present disclosure relate to the field of optical communication systems. In particular, the present disclosure relates to techniques for extending and improving the sensitivity of distributed acoustic sensing (DAS) in subsea optical cables.

Discussion of Related Art

In a distributed acoustic sensing (DAS) system, an optical cable may be used to provide continuous real-time or near real-time monitoring of perturbances or anomalies in the vicinity of the cable. In other words, the cable itself may be used as a sensing element to detect or monitor different types of disruptions, interferences, irregularities, acoustic vibrations, and other activities whether natural or man-made occurring in or out of the local DAS environment near the cable, (e.g., terrestrial environment, oceanic). To do so, optoelectronic devices/equipment coupled to the optical cable of the DAS system may detect and process reflected light signals (e.g., Rayleigh backscattered signals) over a range at a specific distance range in the DAS environment.

Generally, a DAS system may include a station that acts as an interrogator unit (IU) to probe a fiber optic cable using a coherent laser pulse, where changes in the phase of the returning optical backscattered signal are measured. Optical phase shifts between pulses may be proportional to strain in the fiber, leading to the ability to detect vibrations and the like, as measured by the effect of such perturbations in the phase. For example, the DAS system may be based on Rayleigh scattering (otherwise referred to as a Rayleigh-scattering-based DAS system).

In known approaches, distributed sensing is limited to <50 km to 150 km and only one fiber span can be sensed. The sensing fiber used can be Multi-Mode Fiber (MMF), Single-Mode Fiber (SMF) or other fiber types with positive dispersion, typically exhibiting low loss which leads to higher sensing sensitivity. However, for long-haul subsea cables, a fiber span may be on the order of 50 km to 100 km, while the multi-span optically amplified subsea cable system may extend for a total of hundreds or thousands of kilometers. Accordingly, the DAS range and sensing capabilities of known DAS systems is significantly limited.

It is with respect to these and other considerations that the present disclosure is provided.

BRIEF SUMMARY

In one embodiment, a sensing system is provided. The sensing system may include a distributed acoustic sensing (DAS) station to launch a DAS signal as an outbound DAS signal. The system may include a plurality of DAS loopback assemblies, arranged along a plurality of spans, wherein the plurality of DAS loopback assemblies are arranged to separately process the outbound DAS signal, and return the outbound DAS signal as a return DAS signal that comprises a backscattered Rayleigh signal to the DAS station. As such, a given DAS loopback assembly of the plurality of DAS loopback assemblies may include an Erbium-Doped Fiber Amplifier (EDFA) that is arranged to compensate a loss from Rayleigh scattering in the DAS signal, and a filter device having a filtering function that is arranged to selectively send back just the sensing wavelength of the DAS signal.

In another embodiment, an optical communications system is provided. The optical communications system may include a distributed acoustic sensing (DAS) station to launch a DAS signal as an outbound DAS signal along a first path, and to receive a return DAS signal that is derived from the outbound DAS signal along a second path. The optical communications system may further include plurality of loopback assemblies that are spaced from one another to define a plurality of spans, wherein the plurality of DAS loopback assemblies are arranged to separately process the outbound DAS signal, for return to the DAS station as a plurality of backscattered Rayleigh signals, respectively. As such, a given DAS loopback assembly of the plurality of DAS loopback assemblies may include an Erbium-Doped Fiber Amplifier (EDFA) that is arranged to compensate for the loss from Rayleigh scattering in the DAS signal and a filter device having an optical filtering function that is arranged to selectively send back just the sensing wavelength of the DAS signal.

In a further embodiment, a method is provided. The method may include launching a DAS signal from a DAS station as an outbound DAS signal over a first path, and processing the outbound DAS signal at a DAS loopback assembly of a plurality of loopback assemblies. The method may also include returning to the DAS station a return DAS signal that is derived from the outbound DAS signal, after processing by the DAS loopback assembly, wherein the return DAS signal comprises a backscattered Rayleigh signal. As such, the processing of the outbound DAS signal of the DAS loopback assembly may include: compensating the loss from Rayleigh scattering in the DAS signal using an Erbium-Doped Fiber Amplifier (EDFA); and selectively sending back just the sensing wavelength of the DAS signal using an optical filter.

DESCRIPTION OF EMBODIMENTS

Figure 1:
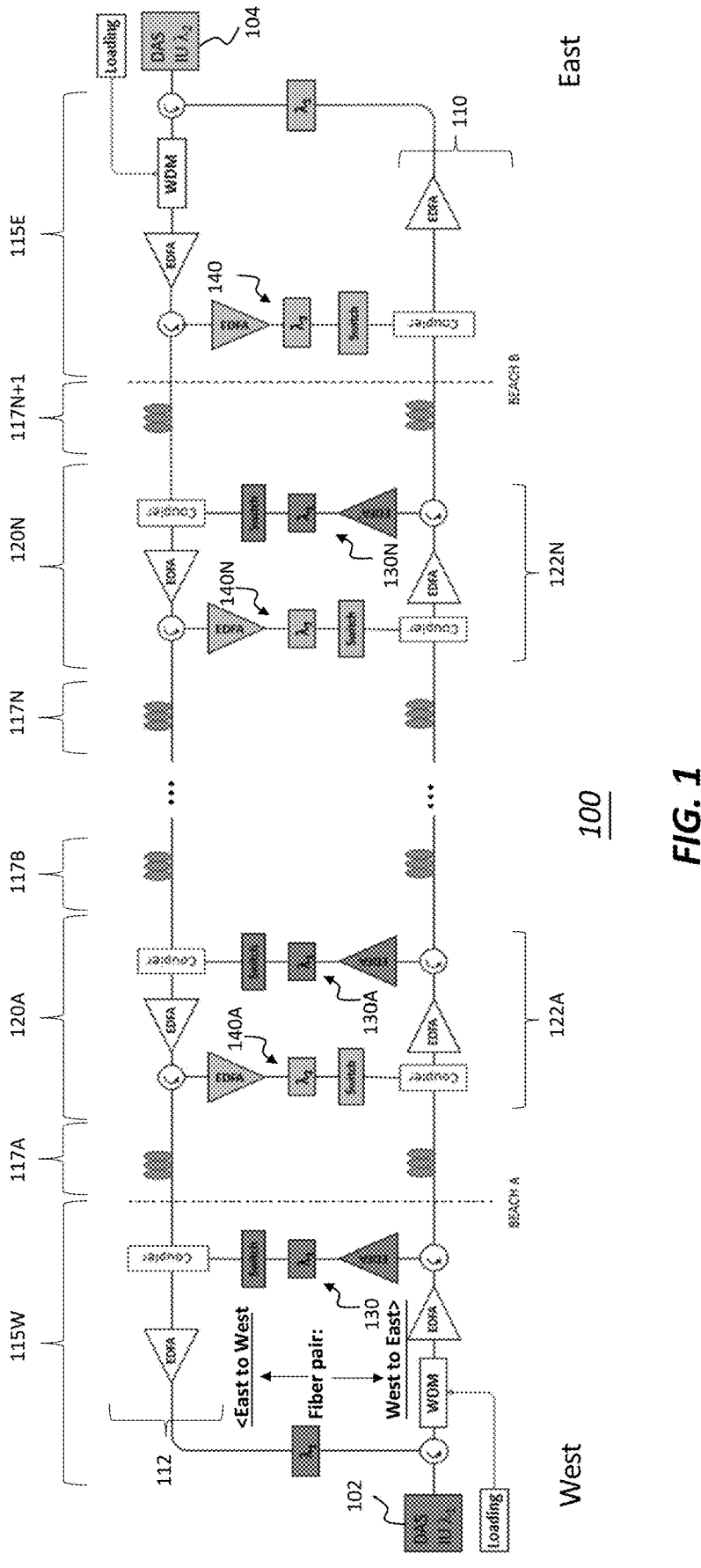
FIG. 1 illustrates an example of a DAS system, according to embodiments of the disclosure.

The present embodiments will now be described more fully hereinafter with reference to the accompanying drawings, in which exemplary embodiments are shown. The scope of the embodiments should not be construed as limited to the embodiments set forth herein. Rather, these embodiments are provided so that this disclosure will be thorough and complete, and will fully convey the scope of the embodiments to those skilled in the art. In the drawings, like numbers refer to like elements throughout.

Before detailing specific embodiments with respect to the figures, general features with respect to the embodiments will be reviewed. Novel DAS apparatus, systems, architecture, and techniques are provided to improve DAS sensing capability, in particular, across multiple spans of a subsea system including above ground and underground optical cables. According to various embodiments, the range of DAS sensing is extended, while the localization capability is improved or maintained by providing span-specific return signal detection components, as discussed below.

In some embodiments, techniques for improving distributed acoustic sensing (DAS) range in subsea optical cables are provided. According to some embodiments, an outbound DAS signal (e.g., light signal) may be transmitted by a DAS device or a DAS station from a first end of an optical cable. To sense a DAS return signal, such as a Rayleigh backscattering signal, the present embodiments provide a novel architecture that may be implemented in conjunction with, or separately from, a subsea optical communications system. As detailed below, the architecture according to the present embodiments may include, in addition to a DAS station used to launch a DAS outbound signal and receive a DAS return signal (such as a Rayleigh backscattered signal), a circulator, a dedicated Rayleigh amplifier ($Ray_{EDFA}$), DAS filter, and an optical switch. In a multi-span system, each of the latter three components may be implemented at each optical repeater of the multi-span system, in accordance with some embodiments of the disclosure.

FIG. 1 illustrates an example of a first DAS system, shown as DAS system 100, according to embodiments of the disclosure. The DAS system 100 includes a first DAS unit, termed DAS station 102, which unit is arranged to launch an optical signal, termed a Distributed Acoustic Sensing signal (DAS signal) into an optical fiber, such as a dedicated DAS fiber, that transmits the DAS signal along a first path 110. In some embodiments, the DAS fiber may form part of an optical cable of a subsea communications system that carries payload signals generally along the first path 110. As used herein the term 'path' may refer to any route or portion of a route that a signal travels between one point and another point, including an entire link between a first DAS station and a second DAS station. As detailed below, the DAS signal may be transmitted through various sections of the DAS system 100, shown as terminal section 115W and terminal section 115E, repeaters 120A, through repeater 120N, through spans 117A, 117B, to 117N and 117N+1 where N may represent any suitable number. The various repeaters, such as repeater 120A, may be defined by a series of DAS loopbacks, shown as DAS loopback 122A, through DAS loopback 122N, where each of these loopbacks includes DAS components as detailed below. According to some non-limiting embodiments, a given DAS loopback may be installed at a terminal section and the location of a repeater of a subsea optical communications system. According to some embodiments, a given DAS span may extend to tens or hundreds of kilometers, meaning that the distance between adjacent DAS loopbacks also ranges between tens of kilometers to a few hundred kilometers.

The DAS system 100 may operate to interrogate the environment near to a cable or other component housing the DAS fiber, at various locations along the first path 110. In some embodiments where a given span may extend for 100 km, for example, the first path may include a dozen or more spans and may extend up to several thousands of kilometers. In some embodiments, the DAS station 102 may be located on land while some of the DAS loopbacks are located at the terminal section and the rest subsea, at intervals of 50 km, 100 km, 200 km, or other suitable intervals. As detailed below, by measuring certain return signals that are routed through the different DAS loopbacks back to the DAS station 102, the DAS system 100 may derive location-specific information regarding perturbations in the environment of the first path 110. In particular, the DAS system 100 may measure in a time division multiplexing fashion the Rayleigh backscattering signals that are routed in a reverse path through one or more of the DAS loopbacks, in order to determine information related to perturbations, such as the location of a perturbation, the duration of the perturbation, the magnitude of the perturbation, and so forth.

As further shown in FIG. 1, each DAS station includes a loopback assembly. For example, DAS station 102 includes loopback assembly 130, while DAS station 104 includes loopback assembly 140. In addition, for all other loopbacks, between the spans 117A to 117N+1, a given DAS loopback includes a first DAS loopback assembly for a given signal direction. These loopbacks are shown in FIG. 1, for example as first DAS loopback assemblies 130A-130N, corresponding to the different DAS loopbacks for routing from the west-to-east direction back to the east-to-west direction. Each DAS assembly may include a circulator at the input of each span, to couple the Rayleigh backscattering signal to a given reverse path of the given DAS loopback. Within a given DAS loopback assembly, an Erbium-Doped Fiber Amplifier (shown in FIG. 1 as EDFA) (which EDFA may also be designated as a $Ray_{EDFA}$) is provided to compensate for the loss from Rayleigh scattering (~33 dB). A filter (labeled in FIG. 1 as "$\lambda_1$") is also provided ($DAS_{filter}$) to filter the amplified Rayleigh signal to transmit just the sensing wavelength, corresponding to the wavelength ($\lambda_1$) of the DAS signal launched at the DAS station 102. An optical switch (labeled as "switch") is also provided in a given DAS loopback assembly to pass the amplified, filtered DAS signal when the optical switch is closed. A coupler is also provided to couple the amplified, filtered, DAS signal to a second path 112, which path may act as a return path for the DAS signal to be routed back to the DAS station 102 for measurement. The DAS signal at the given wavelength ($\lambda_1$) is then received back at the DAS station 102. In various embodiments, the $Ray_{EDFA}$ may have different characteristics from in-line EDFAs that are provided along the first path 110. Note that the gain of inline EDFAs depends on span loss (such as 10 dB for a 50 km span or 20 dB for 100 km span), while the gain of the $Ray_{EDFA}$ is designed to ensure that the path average DAS signal power along the second path 112 is the same (or similar) to the path average power of the DAS signal along the first path 110.

According to various embodiments of the disclosure, the DAS station 102 may include a controller to independently control operation of the different DAS loopbacks of the DAS system 100. In particular, the controller (not separately shown) may individually control each optical switch at each DAS loopback (130A-130N). Thus, the DAS system 100 may act to select a sensing loopback of interest to turn on the optical switch at the associated span, or to turn on and off sequentially the different optical switches at the different spans, in order to scan the Rayleigh backscattered DAS signal one span at a time.

As further shown in FIG. 1, the DAS system 100 may include a second DAS station, shown as DAS station 104, located at an opposite end of the DAS system 100, from the DAS station 102. The DAS station 104 may launch another DAS signal along another optical fiber, such as a dedicated DAS fiber, that transmits the DAS signal along a second path 112. In some embodiments, the additional optical DAS fiber may form part of the same optical cable of a subsea communications system that carries payload signals generally along the first path 110. As with the DAS signal launched by DAS station 102, another DAS signal generated by DAS station 104 may be transmitted through various spans of the DAS system 100. In this embodiment where the DAS system 100 includes a DAS station 104, each of the DAS loopbacks (in repeaters 120N to 120A) may be configured with a second DAS loopback assembly (shown collectively as the DAS loopback assemblies 140N-140A), whose components and operation may be the same as for the first DAS loopback assembly 130A-130N components, described previously. In this case, the DAS station 104 will launch a DAS signal at a second wavelength, shown as $\lambda_2$, where the DAS signal launched from the DAS station 104 may be routed back through any of the DAS loopbacks 140N-140A as an amplified, filtered Rayleigh backscattered radiation, that returns to the DAS station 104 along the first path 110.

In the embodiment specifically depicted in FIG. 1, where two DAS stations are provided to launch DAS signals in opposite directions, the length of a span may be doubled with respect to a similar DAS system having just one DAS station, while preserving the same performance. In particular, the performance of the DAS system 100 may be enhanced by sensing the first half of a given span for a DAS signal launched from the DAS station 102 and sensing the second half of the given span for a DAS signal launched from the DAS station 104. By reducing the number of spans by half (by doubling the span length), the system cost for a DAS system can be reduced (where half as many EDFAs are needed) and the nonlinearity can also be reduced significantly (the nonlinearity is determined by both the system distance and the number of spans implemented).

Figure 2B:
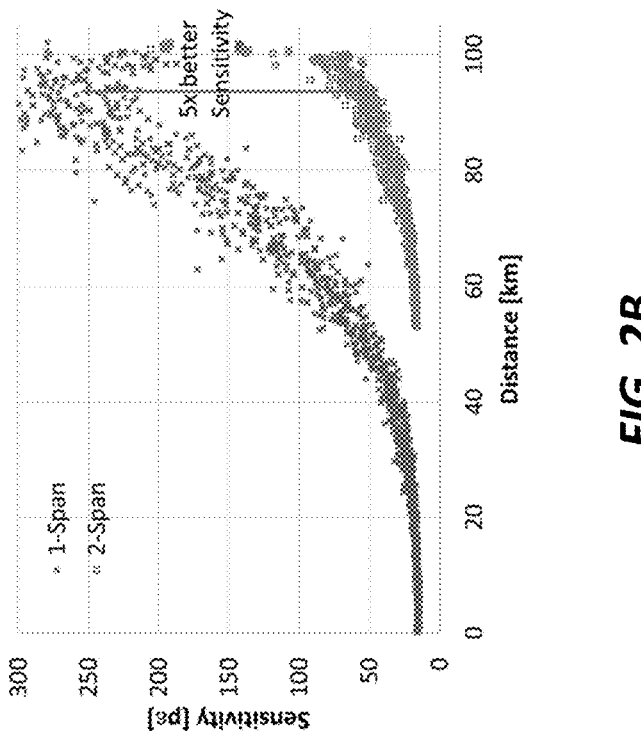
FIG. 2B is a graph showing strain sensitivity using 1-span or 2-spans to monitor a 100-km link.
Figure 2A:
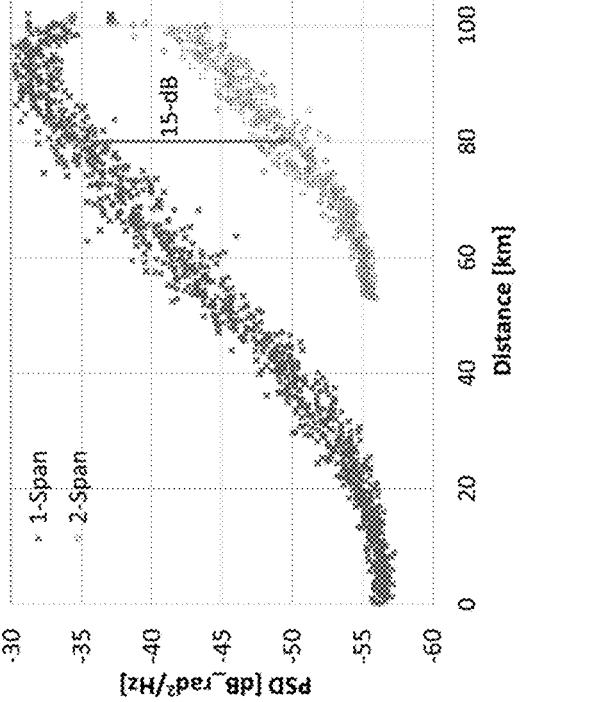
FIG. 2A is a graph showing the Noise floor Power Spectral Density (PSD) using 1-span or 2-spans to monitor a 100-km link.

As an example, to sense/monitor a 100-km long link, one can either construct a one-span link with 100-km fiber or split the link into 2 spans (with a length of 50 km each) with an EDFA in between spans. Note that as used herein, the term link may refer to an entire system length, for example, between one terminal and another terminal of a communications system, while the term span refers to the distance between adjacent repeaters, or adjacent amplifiers along the link. The parameter that is called the noise floor power spectral density (PSD) from the sensing span is a measure of the noise level and determines the sensitivity at a specific location. The units of PSD are in $dB\_rad^2/Hz$ or $dB\_rad/\sqrt{Hz}$. For the noise floor PSD, the lower the value, the better. FIG. 2A compares the experimentally measured noise floor PSD using either 1 or 2 amplified spans to monitor a 100-km span. With the 2-amplified span configuration (see the system of FIG. 1 where the number of spans N is set to 2), one can gain 15-dB sensitivity at ~80 km relative to the single span configuration. FIG. 2B compares the lab measured strain sensitivity (in pε) of the two scenarios. At ~95 km, the strain sensitivity of the 2-amplified spans configuration is 5 times better than that of the single span.

Figure 3B:
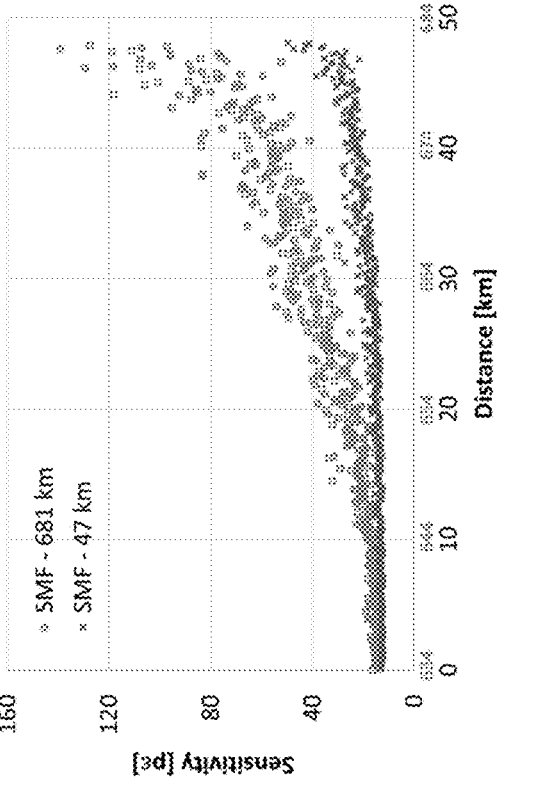
FIG. 3B is a graph showing strain sensitivity of 1-span monitoring a 47 km link and 13 amplified spans (681-km link) while monitoring the very last span.
Figure 3B:
Figure 3A:
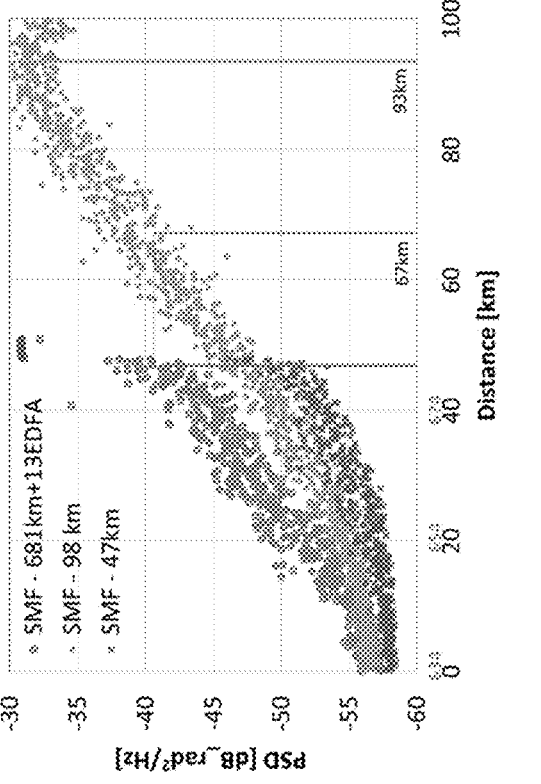
FIG. 3A is a graph showing the noise floor PSD comparison between the following conditions: 1-span monitors 47 km, 1-span monitors 98 km, and 13 amplified spans (681-km link) while monitoring the very last span.

As evident from the data of FIG. 2A, the single span sensing capability may be limited to approximately 100 km distance, assuming a PSD tolerable limit of approximately –30 $dB\_rad^2/Hz$ or 0 $dB\_rad^2$ over a 1 kHz electrical bandwidth. Using the architecture for a DAS system as shown in FIG. 1 and given the ability to construct DAS loopbacks at suitable intervals, such as 100 km, one can measure return DAS signals over a few thousand km total distance from a DAS station. FIG. 3A compares the experimentally measured noise floor PSD for 3 different scenarios: 47 km sensing distancer using 1-span, 98 km sensing distance using a single span, and 681 km sensing distance using 13-amplified spans (including 13 EDFAs, arranged in each of 13 DAS loopbacks, respectively). The noise level PSD is ~–40 $dB\_rad^2/Hz$ after ~680 km, which is roughly equivalent to the noise level at 67 km sensing distance for a single 98 km span. FIG. 3B compares the strain sensitivity (in pc) of 47 km single span and 680 km sensing (with 13 amplified spans). Note that the strain sensitivity at 0 km with a single span sensing and at 634 km with 13-amplified spans sensing is almost identical; the sensitivity does go down (the sensitivity number goes higher) at the end of the sensing span (47 km of single span sensing, and 680 km of 13-amplified span sensing). This decrease is due to the accumulated Amplified Spontaneous Emission (ASE) noise from the inline optical amplifiers.

In some embodiments, since only one sensing wavelength needs to be amplified and sent backwards to a DAS receiver for each sensing span, wavelength selective amplification may be used to replace an EDFA and filter combination within the loopback assemblies (130A-130N, 140A-140N). In particular, embodiments, wavelength selective amplification may be achieved through a known parametric amplifier (phase-matched FWM process) or through a known phase controlled nonlinear optical loop mirror.

The aforementioned embodiments with respect to FIG. 1 may employ 1 or 2 DAS stations, and thus provide an economical approach to sensing perturbances over a long distance, such as several thousand kilometers. If the DAS interrogation pulse repetition rate is such that all backscatter signals are received at the DAS receiver before the next interrogation pulse occurs, then all switches in the loopback can be closed so all spans are monitored. With this slow interrogation rate, only low-frequency disturbances (<10 Hz) will be monitored. However, if the DAS interrogation pulse repetition rate is such that the next interrogation pulse occurs before all backscatter signals have been received at the DAS receiver, then only one of the switches in the loopbacks should be closed, enabling just one loopback. By having only one switch closed, the span associated with the switch can be monitored at a faster interrogation rate so higher-frequency disturbances (>500 Hz) can be monitored.

Figure 4A:
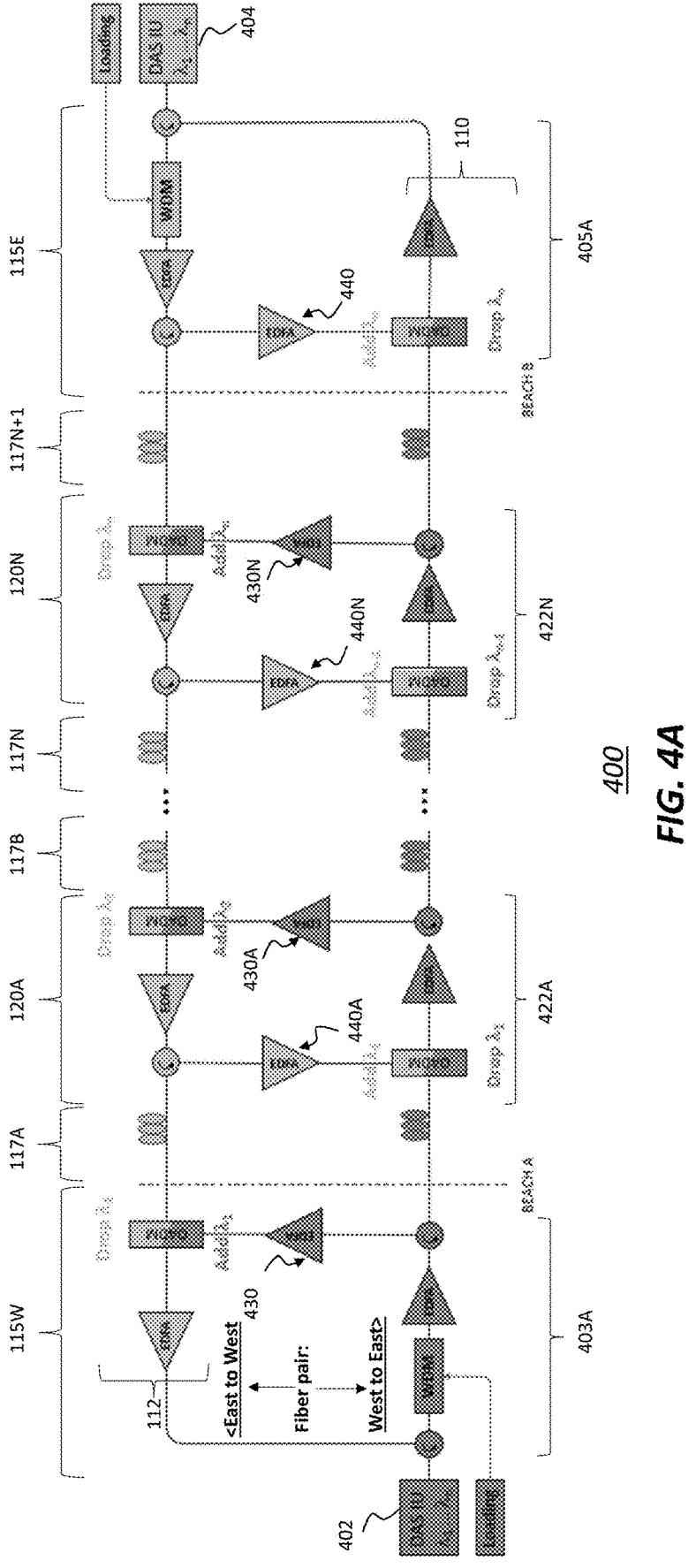
FIG. 4A illustrates the architecture of another DAS system according to embodiments of the disclosure.

FIG. 4A illustrates the architecture of another DAS system according to embodiments of the disclosure. The DAS system 400 may have an architecture that is generally the same as the architecture of FIG. 1, including a plurality of sections, again shown as terminal sections 115W and 115E, repeaters 120A, through repeater 120N, and the spans, 117A through 117N+1. A given repeater includes a DAS loopback, such as DAS loopbacks 422A-422N, where each loopback includes two different loopback assemblies for routing signals in opposite directions. These loopback assemblies are shown as loopback assemblies 430A-430N for routing signals from initial west-to-east direction back to east-to-west, and loopback assemblies 440A-440N for routing signals from east-to-west direction back to west-to east. Note that for repeaters 120A-120N successive repeaters and thus the associated successive loopbacks are separated by the distance of one span. In this embodiment, a given DAS station, such as DAS station 402, is arranged with a plurality of DAS units or interrogators (not separately shown). Each DAS unit may include a light source such as a laser that is configured to emit light at a determined wavelength, where the different wavelengths corresponding to the different DAS units are shown as $\lambda_1$ to $\lambda_n$. In some embodiments, the number of different DAS units in DAS station 402 or DAS station 404 may correspond to the number N of spans 117A-1 to 17N+1. In this manner, all spans 117A-117N+1 may be interrogated simultaneously by simultaneously launching signals from a DAS station, such as DAS station 402, at each given wavelength $\lambda_1$ to $\lambda_n$ into the same fiber. In order to properly process and interrogate a given DAS signal, each given loopback 430A-430N is configured to transmit a given wavelength of the plurality of wavelengths $\lambda_1$ to $\lambda_n$. In particular, with reference to DAS station 402, a series of DAS loopback assemblies 430A-430N are provided in each DAS loopback. As shown in FIG. 4A, a given DAS loopback assembly includes, in addition to a circulator, an EDFA that amplifies the DAS signal, such as a Rayleigh backscatter signal, as described above. In addition, an optical add drop multiplexer (OADM) is provided in each DAS loopback assembly to drop a forward DAS signal and add the Rayleigh backscatter signal to loopback to the given DAS station.

Figure 4B:
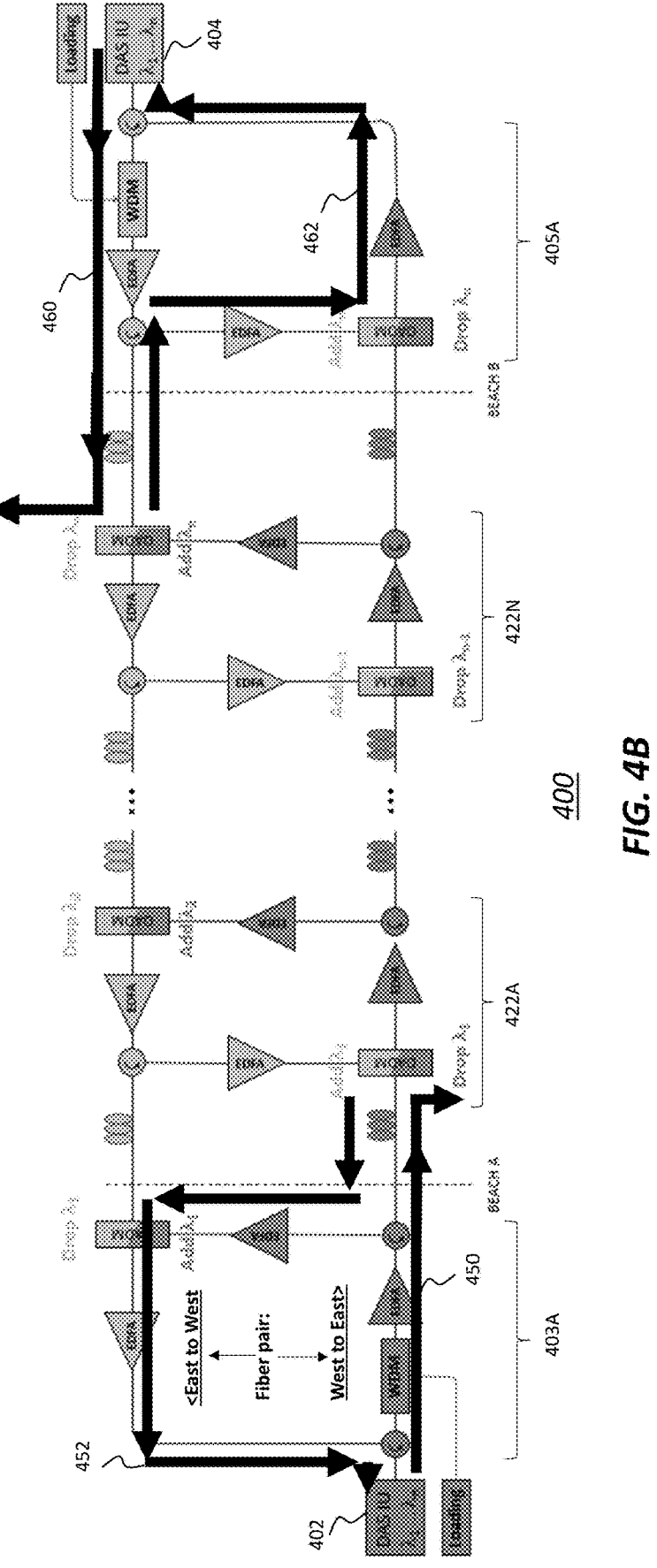
FIG. 4B illustrates one scenario of operation for the system in FIG. 4A.
Figure 5:
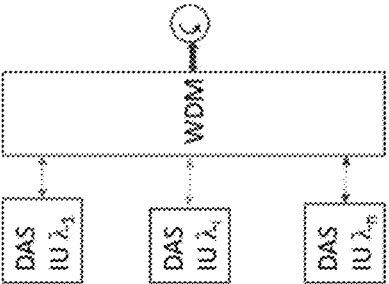
FIG. 5 illustrates the architecture of a DAS station according to embodiments of the disclosure.

FIG. 4B illustrates one scenario of operation of the system of FIG. 4A. The scenario shows signal paths 450, 452 for a signal launched from the DAS station 402, and signal paths 460, 462 for a signal launched from the DAS station 404. In this example, the signal paths shown correspond to the wavelength $\lambda_1$, and $\lambda_n$, where the signal paths are accordingly routed back to the respective launching DAS station at the terminal loopbacks 403A and 405A. Since the wavelengths of the Rayleigh signals routed through different DAS loopbacks corresponding to different spans all may differ from one another, the different return DAS signals may be transmitted together back to the DAS station 402 without coherent interference. Thus, the DAS station 402 may sense return DAS signals from all spans simultaneously if the appropriate wavelength demultiplexing components (not separately shown) are provided in DAS station 402. In particular, all DAS signals from $\lambda_1$ to $\lambda_n$ that are generated by a DAS transmitter at the DAS station 102 may be sent back to a DAS receiver at the DAS station 102, where a Wavelength Division Multiplexer (WDM) is needed to separate the DAS signals received at different wavelengths, as shown in FIG. 5. In some embodiments, the same WDM may be used to combine all DAS signals sent from a DAS transmitter.

In summary, in distinction from the embodiment of FIG. 1, a salient feature of the embodiment of FIG. 4A is the provision of an OADM with each $Ray_{EDFA}$ in each DAS loopback assembly, as well as an optical wavelength division multiplexer/demultiplexer in a transmitter and a receiver, respectively, of a given DAS station. The OADM drops the forward DAS signal and adds the back-reflected Rayleigh signal from the other direction. In this implementation, since a given OADM performs a filter function, an additional $DAS_{filter}$ is not required in a given DAS loopback assembly.

In some embodiments, instead of the WDM shown in FIG. 5, an Arrayed Waveguide Grating (AWG) or couplers may be used to combine or separate DAS signals at different wavelengths.

As further depicted in FIG. 4A, similar to what architecture is provided in FIG. 1, a second set of DAS equipment (wavelength centered from $\lambda_1$ to $\lambda_n$), shown as DAS station 404, may be used in a similar fashion to sense DAS signals along the spans 117A-117N+1. As discussed previously, the span length may be doubled without sacrificing performance, by sensing the first half of a given span from each direction. By reducing the number of the spans by half, the system cost can be reduced, and the nonlinearity can also be significantly reduced.

Note that in the aforementioned embodiments, such as DAS system 100 or DAS system 400, the DAS sensing may be performed over a single fiber pair, representing the first path 110 and the second path 112, for example. However, existing subsea optical communication systems can support more than 16 fiber pairs (FPs), and the industry is developing technologies to support much larger numbers of fiber pairs. For example, terrestrial systems, can support several thousand fiber pairs. In additional embodiments, by taking advantage of the ability to include multiple fiber pairs in a DAS system, an entire link, including multiple spans, may be sensed using different fiber pairs. For example, a first fiber pair FP1 may be used to sense a first span1, FP2 may be used to sense span2, etc. In this circumstance, all DAS equipment can operate at the same wavelength, such that the optical switches or the OADMs may be omitted from DAS loopbacks, since a given fiber that carries a given return DAS signal corresponds to a single span.

In additional embodiments of the disclosure, multiple fiber pairs, multiple optical switches, and multiple OADMs may be combined in any suitable fashion to build a more economical disturbed sensing network.

Herein, novel and inventive apparatus, system and techniques for improving DAS sensing capability, including sensing over multiple spans, simultaneously, or in a serial fashion, more efficient sensing by sending DAS signals in two opposing directions, in order to extend DAS sensing capability over longer distances covering multiple spans, including providing span-specific DAS information.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation, in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A sensing system comprising:
a distributed acoustic sensing (DAS) station to launch a DAS signal as an outbound DAS signal;
a plurality of DAS loopback assemblies, arranged along a plurality of spans, wherein the plurality of DAS loopback assemblies are arranged to separately process the outbound DAS signal, and return the outbound DAS signal to the DAS station as a return DAS signal that comprises a backscattered Rayleigh signal, wherein a given DAS loopback assembly of the plurality of DAS loopback assemblies comprises:

an Erbium-Doped Fiber Amplifier (EDFA) that is arranged to compensate a loss from Rayleigh scattering of the DAS signal; and a filter device having an optical filtering function that is arranged to selectively send back just a sensing wavelength of the DAS signal.

2. The sensing system of claim 1, wherein the filter device comprises a DAS filter or an optical add drop multiplexer (OADM).

3. The sensing system of claim 2, wherein the filter device is an OADM, wherein the DAS station comprises a plurality of light sources, arranged to launch the outbound DAS signal at a plurality of wavelengths, wherein a first OADM at the given DAS loopback assembly is arranged to add the Rayleigh backscatter signal as a first Rayleigh backscatter signal at a first wavelength of the plurality of wavelengths, and wherein a second loopback assembly of the plurality of DAS loopback assemblies comprises a second OADM that is arranged to add a second Rayleigh backscatter signal at a second wavelength of the plurality of wavelengths, different from the first wavelength.

4. The sensing system of claim 3, the DAS station further comprising a wavelength division multiplexer/demultiplexer, arranged to separate the first Rayleigh backscatter signal from the second Rayleigh backscatter signal.

5. The sensing system of claim 1, wherein the DAS station is located at a first end of an optical communications system, wherein the DAS station is configured to send the outbound DAS signal over a first link of the optical communications system, and wherein the plurality of DAS loopback assemblies are arranged to route the return DAS signal over a second link of the optical communications system.

6. The sensing system of claim 5, wherein the DAS station is a first DAS station, wherein the outbound DAS signal is a first outbound DAS signal, and wherein the return DAS signal is a first return DAS signal, the system further comprising:

a second DAS station, located at a second end of the optical communications system, wherein the second DAS station is configured to send a second outbound DAS signal over the second link of the optical communications system, and wherein the plurality of DAS loopback assemblies are arranged to route a second return DAS signal, derived from the second outbound DAS signal, over the first link of the optical communications system to the second DAS station.

7. The sensing system of claim 1, wherein a distance between adjacent DAS loopback assemblies of the plurality of DAS loopback assemblies, is between tens of kilometers to a few hundred kilometers.

8. The sensing system of claim 1, wherein the given DAS loopback assembly further comprises an optical switch to pass the return DAS signal to the DAS station when the optical switch is closed.

9. The sensing system of claim 1, wherein the DAS signal is launched over a plurality of N fiber pairs, wherein the plurality of spans comprises N spans, and wherein the DAS signal is routed through the given DAS loopback assembly over a dedicated fiber pair of the plurality of N fiber pairs.

10. An optical communications system, comprising:

a distributed acoustic sensing (DAS) station to launch a DAS signal as an outbound DAS signal along a first path, and to receive a return DAS signal that is derived from the outbound DAS signal along a second path;

a plurality of DAS loopback assemblies that are spaced from one another to define a plurality of spans, wherein the plurality of DAS loopback assemblies are arranged to separately process the outbound DAS signal, for return to the DAS station as a plurality of backscattered Rayleigh signals, respectively, wherein a given DAS loopback assembly of the plurality of DAS loopback assemblies comprises:

an Erbium-Doped Fiber Amplifier (EDFA) that is arranged to compensate a loss from Rayleigh scattering of the DAS signal; and a filter device having an optical filtering function that is arranged to selectively send back just a sensing wavelength of the DAS signal.

11. The optical communications system of claim 10, wherein the DAS station is a first DAS station, wherein the outbound DAS signal is a first outbound DAS signal, and wherein the return DAS signal is a first return DAS signal, the optical communications system further comprising:

a second DAS station, located at a second end of the optical communications system, wherein the second DAS station is configured to send a second outbound DAS signal over the second path of the optical communications system, and wherein the plurality of DAS loopback assemblies are arranged to route a second return DAS signal, derived from the second outbound DAS signal, over the first path of the optical communications system to the second DAS station.

12. The optical communications system of claim 10, wherein the filter device comprises a DAS filter or an optical add drop multiplexer (OADM).

13. The optical communications system of claim 12, wherein the DAS station comprises a plurality of light sources, arranged to launch the outbound DAS signal at a plurality of wavelengths, wherein a first OADM at the given DAS loopback assembly is arranged to add a Rayleigh backscatter signal as a first Rayleigh backscatter signal at a first wavelength of the plurality of wavelengths, and wherein a second DAS loopback assembly of the plurality of DAS loopback assemblies comprises a second OADM that is arranged to add a second Rayleigh backscatter signal at a second wavelength of the plurality of wavelengths, different from the first wavelength.

14. The optical communications system of claim 10, wherein the DAS station is located at a first end of an optical communications system, wherein the DAS station is configured to send the outbound DAS signal over a first link of the optical communications system, and wherein the plurality of DAS loopback assemblies are arranged to route the return DAS signal over a second link of the optical communications system.

15. The optical communications system of claim 10, wherein a distance between adjacent DAS loopback assemblies of the plurality of DAS loopback assemblies, is between tens of kilometers to a few hundred kilometers.

16. The optical communications system of claim 10, wherein the given DAS loopback assembly further comprises an optical switch to pass the return DAS signal to the DAS station when the optical switch is closed.

17. A method, comprising:

launching a DAS signal from a DAS station as an outbound DAS signal over a first path;

processing the outbound DAS signal at a DAS loopback assembly of a plurality of DAS loopback assemblies; and returning to the DAS station a return DAS signal that is derived from the outbound DAS signal, after processing by the DAS loopback assembly, wherein the return DAS signal comprises a backscattered Rayleigh signal, wherein processing the outbound DAS signal of the DAS loopback assembly comprises:

compensating a loss from Rayleigh scattering of the DAS signal using an Erbium-Doped Fiber Amplifier (EDFA); and selectively sending back just a sensing wavelength of the DAS signal using an optical filter.

18. The method of claim 17, wherein the optical filter comprises a DAS filter or an optical add drop multiplexer (OADM).

19. The method of claim 17, wherein the DAS station is a first DAS station in an optical communications system, wherein the outbound DAS signal is a first outbound DAS signal, and wherein the return DAS signal is a first return DAS signal, the optical communications system further comprising:

a second DAS station, located at a second end of the optical communications system, wherein the second DAS station is configured to send a second outbound DAS signal over a second path of the optical communications system, and wherein the plurality of loopback assemblies are arranged to route a second return DAS signal, derived from the second outbound DAS signal, over the first path of the optical communications system to the second DAS station.

20. The method of claim 17, wherein the DAS station comprises a plurality of light sources, arranged to launch the outbound DAS signal at a plurality of wavelengths, wherein a first optical add drop multiplexer (OADM) at the DAS loopback assembly is arranged to add the Rayleigh backscatter signal as a first Rayleigh backscatter signal at a first wavelength of the plurality of wavelengths, and wherein a second DAS loopback assembly of the plurality of DAS loopback assemblies comprises a second OADM that is arranged to add a second Rayleigh backscatter signal at a second wavelength of the plurality of wavelengths, different from the first wavelength.

21. The method of claim 17, wherein the plurality of DAS loopback assemblies comprise a plurality of optical switches, respectively, the method further comprising:

to monitor relatively lower frequency disturbances (<10 Hz), setting all of the plurality of optical switches to a closed position, and launching the DAS signal as a series of interrogation pulses at a first interrogation rate that is sufficiently slow, wherein all of a set of backscatter Rayleigh signals, received through all of the plurality of loopback assemblies are received at the DAS station between a first interrogation pulse and a next interrogation pulse, immediately subsequent to the first interrogation pulse; and to monitor relatively higher frequency disturbances (>500 Hz), setting just one optical switch at just one loopback assembly of the plurality of loopback assemblies to a closed position, while maintaining each other loopback assembly of the plurality of loopback assemblies to an open position, and launching the DAS signal at a second interrogation rate, greater than the first interrogation rate.

* * * * *